(12) United States Patent
Branton, Jr. et al.

(10) Patent No.: US 6,301,336 B1
(45) Date of Patent: Oct. 9, 2001

(54) METHOD AND APPARATUS FOR TESTING COMPONENTS IN A COMMUNICATIONS SYSTEM

(75) Inventors: Robert Branton, Jr., Farmers Branch; John Mark DeMoss, The Colony; Roy Feldt, Rowlett; Mark Lamb, Plano; Rick Sheffield, Rowlett, all of TX (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/048,409

(22) Filed: Mar. 26, 1998

(51) Int. Cl.[7] ............................... H04M 1/24; H04M 3/22
(52) U.S. Cl. ................................... 379/29.01; 379/29.09; 379/15.01; 379/9.01; 379/15.05; 379/29.1
(58) Field of Search ................................... 379/1, 2, 6, 9, 379/10, 12, 15, 16, 21, 22, 26, 29, 201, 34, 112; 714/712; 375/224; 370/242, 244, 245

(56) References Cited

U.S. PATENT DOCUMENTS

| | | | |
|---|---|---|---|
| 5,519,774 | * 5/1996 | Battista et al. | 379/386 |
| 5,734,696 | * 3/1998 | Day | 379/15 |
| 5,825,769 | * 10/1998 | O'Reilly et al. | 379/113 |
| 5,835,566 | * 11/1998 | Cowgill | 379/1 |
| 5,919,248 | * 7/1999 | Kahkoska et al. | 379/29 |
| 5,946,372 | * 8/1999 | Jones et al. | 379/1 |
| 5,946,373 | * 8/1999 | Harris | 379/26 |
| 5,953,406 | * 9/1999 | Larue et al. | 379/265 |
| 5,954,829 | * 9/1999 | McLain, Jr. et al. | 370/241 |
| 5,966,427 | * 10/1999 | Shaffer et al. | 379/27 |
| 5,987,633 | * 11/1999 | Newmann et al. | 379/15 |
| 6,016,334 | * 1/2000 | Kasrai | 379/15 |
| 6,047,045 | * 4/2000 | Bauer et al. | 379/207 |
| 6,049,590 | * 4/2000 | Bond et al. | 379/10 |
| 6,052,456 | * 4/2000 | Huang | 379/201 |
| 6,091,713 | * 7/2000 | Lechleider et al. | 379/27 |

\* cited by examiner

Primary Examiner—Curtis Kuntz
Assistant Examiner—Rexford Barnie

(57) ABSTRACT

A method and apparatus for testing network elements within a communications system. A test is initiated at a data processing system located at a first site by the selection of one or more network elements for testing. In initiating the test, a communications link is established between the data processing system located at the first site and a network element located at a second site. The network element is monitored during testing of the network element using the communications link. The information is displayed on the data processing system in the form of a web page. Monitoring of the network element is paused from the data processing system in response to detecting an error originating from the network element. Monitoring of the network element is restarted from the data processing system in response to a correction of the error. These steps of monitoring, pausing, and restarting are repeated until a selected amount of time has passed without an occurrence of an error originating from the second network element.

18 Claims, 24 Drawing Sheets

Test Detail

Project# 018835-02

Project Control  /610

Project Log Editor  /612          *608*

| System | 1+1 Nortel 2.4 Gb/s DNG-BLN SSP-SP C/C |
|---|---|
| Status | PAUSE |
| Test Started | 07/16 19:06 |
| Hour | 245 |
| Progress | 169% |
| Estimated Completion | 1997-07-25 13:41:11 |
| Restarts | 13 |
| Supervisor | Jim Miller<br>Phone: 9725557424 or 5557424<br>Pager PIN: 73810<br>E-mail: Jim.Miller@mci.com |
| Project Description | This project phase will add a new 1+1 Nortel 2.4 Gb/s system between Downers Grove and Bloomington, IL. |

*Performance Report T01883502.HTM does not yet exist.*

FIG. 6B

Project 018835-02

| System | 1+1 Nortel 2.4 Gb/s DNG-BLN SSP-SP C/C |
|---:|:---:|
| Project Status | ACTIVE |
| Start Time | 1997-07-16  19:06:03 |
| Test Hour | 244 |

*To pause the test, press the* PAUSE *button*
*If the test is over, press the* FINISH *button*

614

Project 018835-02

*Please confirm that you want to* PAUSE *this project.*

| Type the reason for pausing this test, and any other relevant information, in the space to the right, then press OK. Or press CANCEL to abort this action. | This is a test of pausing to testing |
|---|---|
| <u>624</u> | <u>626</u> |

622

Project 018835-02

| System | 1+1 Nortel 2.4 Gb/s DNG-BLN SSP-SP C/C |
|---:|:---:|
| Project Status | PAUSE    _636_ |
| Start Time | 1997-07-16  19:06:03 |
| Test Hour | 244 |

| Test Is Paused!    _634_ ||
|---:|:---|
| Paused at | 1997-07-28  14:49:52    _638_ |
| Reason | Test paused due to a non service affecting critical alarm at regen. 2nd level support investigating.    _640_ |

*To restart the test, press the* RESTART *button below*    _632_

Project 018835-02

*Please confirm that you want to* RESTART *this project.*

| Describe problems found and corrected, or enter any other relevant information regarding the test in the space to the right, then press OK. Or press CANCEL to abort this action.<br>_648_ | This is a test of restarting testing<br><br><br><br><br>_650_ |
|---|---|

_646_

Project Log
Project# 021764-01

*656*

| Log Time | Type | Log Entry | | | | | | | | Edit |
|---|---|---|---|---|---|---|---|---|---|---|
| 10/30 15:50 | FINISH | Last project report 10/30 says test complete. Finished test -mlamb | | | | | | | | ● |
| 10/30 14:45 | PERFORMANCE NOMINAL | No performance events in 8 hours. | | | | | | | | |
| 10/30 11:18 | PERFORMANCE EVENT | NE | Level | Line | Dir | Span | CV | ES | SES | UAS |
| | | 10665 | OC12 | 7 | | LINE | 0 | 1335 | 1335 | |
| | | 10665 | OC48 | 2 | | LINE | 1923 | 65535 | 65535 | |
| 10/30 11:03 | PERFORMANCE NOMINAL | No performance events in 3 hours. | | | | | | | | |
| 10/30 07:37 | PERFORMANCE EVENT | NE | Level | Line | Dir | Span | CV | ES | SES | UAS |
| | | 10665 | DS3 | 1 | T | PATH | 0 | 1 | 1 | 0 |
| | | 10665 | DS3 | 36 | R | PATH | 0 | 1 | 1 | 0 |
| | | 10665 | OC12 | 7 | | LINE | 0 | 23702 | 23702 | |
| 10/30 07:27 | PERFORMANCE EVENT | NE | Level | Line | Dir | Span | CV | ES | SES | UAS |
| | | 10665 | DS3 | 1 | T | PATH | 0 | 1 | 1 | 0 |
| | | 10665 | DS3 | 36 | R | PATH | 0 | 1 | 1 | 0 |
| | | 10665 | OC12 | 7 | | LINE | 0 | 23702 | 23702 | |
| 10/30 07:16 | PERFORMANCE EVENT | NE | Level | Line | Dir | Span | CV | ES | SES | UAS |
| | | 10665 | DS3 | 1 | T | PATH | 0 | 1 | 1 | 0 |
| | | 10665 | DS3 | 36 | R | PATH | 0 | 1 | 1 | 0 |
| | | 10665 | OC12 | 7 | | LINE | 0 | 23702 | 23702 | |
| 10/30 07:04 | PERFORMANCE EVENT | NE | Level | Line | Dir | Span | CV | ES | SES | UAS |
| | | 10665 | DS3 | 1 | T | PATH | 0 | 1 | 1 | 0 |
| | | 10665 | DS3 | 36 | R | PATH | 0 | 1 | 1 | 0 |
| | | 10665 | OC12 | 7 | | LINE | 0 | 23702 | 23702 | |
| 10/30 06:51 | PERFORMANCE EVENT | NE | Level | Line | Dir | Span | CV | ES | SES | UAS |
| | | 10666 | DS3 | 36 | R | PATH | 0 | 0 | 0 | 71 |
| | | 10666 | DS3 | 36 | T | PATH | 0 | 0 | 0 | 71 |
| | | 10666 | OC48 | 2 | | LINE | 5190 | 3726 | 3723 | |
| 10/30 06:35 | PERFORMANCE NOMINAL | No performance events in one hour. | | | | | | | | |
| 10/30 05:27 | PERFORMANCE EVENT | NE | Level | Line | Dir | Span | CV | ES | SES | UAS |
| | | 10665 | OC48 | 1 | | LINE | 0 | 52 | 52 | |
| | | 10665 | OC48 | 2 | | LINE | 0 | 14381 | 14381 | |
| 10/30 05:14 | PERFORMANCE EVENT | NE | Level | Line | Dir | Span | CV | ES | SES | UAS |
| | | 10665 | DS3 | 1 | T | PATH | 0 | 1 | 1 | 766 |
| | | 10665 | DS3 | 36 | R | PATH | 0 | 7 | 7 | 789 |
| | | 10665 | DS3 | 36 | T | PATH | 0 | 7 | 7 | 789 |
| | | 10665 | OC12 | 8 | | LINE | 0 | 1 | 1 | |
| 10/30 05:00 | PERFORMANCE NOMINAL | No performance events in 3 hours. | | | | | | | | |
| 10/30 01:51 | PERFORMANCE EVENT | NE | Level | Line | Dir | Span | CV | ES | SES | UAS |
| | | 10666 | DS3 | 1 | R | PATH | 3 | 4 | 2 | 0 |
| | | 10666 | DS3 | 1 | T | PATH | 2 | 4 | 2 | 0 |
| | | 10666 | DS3 | 36 | R | PATH | 0 | 0 | 0 | 54 |
| | | 10666 | DS3 | 36 | T | PATH | 0 | 0 | 0 | 63 |
| 10/30 01:38 | PERFORMANCE EVENT | NE | Level | Line | Dir | Span | CV | ES | SES | UAS |
| | | 10666 | DS3 | 1 | R | PATH | -3 | -4 | -2 | 31 |
| | | 10666 | DS3 | 1 | T | PATH | -2 | -4 | -2 | 29 |
| | | 10666 | DS3 | 36 | R | PATH | 0 | 5 | 5 | 18 |
| | | 10666 | DS3 | 36 | T | PATH | 0 | 5 | 5 | 9 |
| 10/30 01:20 | PERFORMANCE NOMINAL | No performance events. | | | | | | | | |

FIG. 6G

| Date/Time | Event | Details | |
|---|---|---|---|
| 10/30 01:05 | PERFORMANCE EVENT | <table><tr><th>NE</th><th>Level</th><th>Line</th><th>Dir</th><th>Span</th><th>CV</th><th>ES</th><th>SES</th><th>UAS</th></tr><tr><td>10665</td><td>DS3</td><td>1</td><td>T</td><td>PATH</td><td>0</td><td>2</td><td>2</td><td>0</td></tr><tr><td>10665</td><td>DS3</td><td>36</td><td>R</td><td>PATH</td><td>0</td><td>-1</td><td>-1</td><td>49</td></tr><tr><td>10665</td><td>DS3</td><td>36</td><td>T</td><td>PATH</td><td>3</td><td>0</td><td>-1</td><td>68</td></tr><tr><td>10666</td><td>DS3</td><td>1</td><td>R</td><td>PATH</td><td>3</td><td>4</td><td>3</td><td>38</td></tr><tr><td>10666</td><td>DS3</td><td>1</td><td>T</td><td>PATH</td><td>171</td><td>16</td><td>15</td><td>21</td></tr><tr><td>10666</td><td>DS3</td><td>36</td><td>R</td><td>PATH</td><td>0</td><td>2</td><td>2</td><td>188</td></tr><tr><td>10666</td><td>DS3</td><td>36</td><td>T</td><td>PATH</td><td>0</td><td>2</td><td>2</td><td>207</td></tr><tr><td>10666</td><td>OC12</td><td>7</td><td></td><td>LINE</td><td>0</td><td>3</td><td>3</td><td></td></tr><tr><td>10666</td><td>OC12</td><td>8</td><td></td><td>LINE</td><td>0</td><td>4</td><td>4</td><td></td></tr><tr><td>10666</td><td>OC48</td><td>2</td><td></td><td>LINE</td><td>0</td><td>65325</td><td>65325</td><td></td></tr></table> | |
| 10/30 00:52 | PERFORMANCE NOMINAL | No performance events. | |
| 10/30 00:17 | PERFORMANCE EVENT | <table><tr><th>NE</th><th>Level</th><th>Line</th><th>Dir</th><th>Span</th><th>CV</th><th>ES</th><th>SES</th><th>UAS</th></tr><tr><td>10665</td><td>DS3</td><td>36</td><td>R</td><td>PATH</td><td>0</td><td>2</td><td>2</td><td>0</td></tr><tr><td>10665</td><td>DS3</td><td>36</td><td>T</td><td>PATH</td><td>0</td><td>2</td><td>2</td><td>0</td></tr><tr><td>10665</td><td>OC12</td><td>7</td><td></td><td>LINE</td><td>0</td><td>26056</td><td>26056</td><td></td></tr><tr><td>10665</td><td>OC12</td><td>8</td><td></td><td>LINE</td><td>0</td><td>40</td><td>40</td><td></td></tr></table> | |
| 10/30 00:04 | PERFORMANCE NOMINAL | No performance events in 7 hours. | |
| 10/29 16:40 | PERFORMANCE EVENT | <table><tr><th>NE</th><th>Level</th><th>Line</th><th>Dir</th><th>Span</th><th>CV</th><th>ES</th><th>SES</th><th>UAS</th></tr><tr><td>10665</td><td>OC12</td><td>7</td><td></td><td>LINE</td><td>0</td><td>65364</td><td>65364</td><td></td></tr><tr><td>10665</td><td>OC12</td><td>8</td><td></td><td>LINE</td><td>0</td><td>7007</td><td>7007</td><td></td></tr></table> | |
| 10/29 16:27 | PERFORMANCE NOMINAL | No performance events in 22 hours. | |
| 10/28 18:34 | RESTART | testing restart... | ◉ |
| 10/28 18:34 | PERFORMANCE NOMINAL | No performance events. | |
| 10/28 18:34 | PAUSE | Test pause | ◉ |
| 10/28 18:23 | PERFORMANCE NOMINAL | No performance events in 54 hours. | |
| 10/26 12:38 | RESTART | Couldn't restart this test on the web. Would like to continue test ASAP. **NOTE: if you're having problems with access to the website send an email to Mark.Lamb@MCI.Com and describe the problem, or call me at 972-555-5500, VNET 111-5500 | ◉ |
| 10/23 09:52 | PERFORMANCE EVENT | <table><tr><th>NE</th><th>Level</th><th>Line</th><th>Dir</th><th>Span</th><th>CV</th><th>ES</th><th>SES</th><th>UAS</th></tr><tr><td>10665</td><td>DS3</td><td>36</td><td>R</td><td>PATH</td><td>0</td><td>1</td><td>1</td><td>0</td></tr><tr><td>10665</td><td>DS3</td><td>36</td><td>T</td><td>PATH</td><td>0</td><td>1</td><td>1</td><td>0</td></tr><tr><td>10666</td><td>DS3</td><td>36</td><td>R</td><td>PATH</td><td>0</td><td>1</td><td>1</td><td>0</td></tr><tr><td>10666</td><td>DS3</td><td>36</td><td>T</td><td>PATH</td><td>0</td><td>1</td><td>1</td><td>0</td></tr></table> | |
| 10/23 09:18 | PERFORMANCE NOMINAL | No performance events in 37 hours. | |
| 10/21 20:21 | RESTART | Job built. | ◉ |
| 10/21 19:51 | PAUSE | Need to build job. Will resume when complete. | ◉ |
| 10/21 19:30 | START | Initial test start. M.Lamb | ◉ |

Project Control — 681

Previous Page — 683

FIG. 6H

| | | | |
|---|---|---|---|
| NE 0113, NE 0144, NE 0256 Test | 6:30 AM - MAR 03, 1998 6:30 AM - MAR 04, 1998 | 1 | C04 |
| NE 0223, NE 0224, NE 0227, NE 0228 Test | 7:00 PM - FEB 28, 1998 8:00 AM - MAR 02, 1998 | 2 | --- |
| .... | .... | ... | ... |

METHOD AND APPARATUS FOR TESTING COMPONENTS IN A COMMUNICATIONS SYSTEM

CROSS REFERENCE TO RELATED APPLICATIONS

The following patent applications of common assignee are related to the present application: U.S. Application entitled "Intranet Graphical User Interface for SONET Network Managements", Ser. No. 08/778,731, filed Dec. 31, 1996, and U.S. Application entitled "System and Method for the Automated Configuration of Network Elements in a Telecommunications Network", Ser. No. 08/778,732, filed Dec. 31, 1996. These applications are incorporated herein by reference.

BACKGROUND OF THE INVENTION

1. Technical Field

The present invention relates generally to an improved system and in particular to an improved method and apparatus for testing a communications system. Still more particularly, the present invention provides an improved method and apparatus for testing network elements in a communications system.

2. Description of the Related Art

In a communications system using synchronous optical network (SONET equipment, newly installed network elements are required to be tested prior to the new network elements being placed in service as being fully functional and capable with existing equipment. Typically, a live remote system test is executed when SONET network equipment is newly installed in the communications system. The new network elements are typically required to log a specific number of hours of error free performance to satisfy testing requirements. These hours of error free performance do not have to be consecutive. When an error occurs, the clock is stopped, the error is corrected, the test restarted, and the clock restarted. This sequence is repeated while the required hours of error free performance are logged. All errors, pauses, and restarts are typically documented. This remote system test is employed to ensure that newly installed equipment is fully functional and works with existing equipment.

Presently, an engineer or other technician is required to be on site with the newly installed equipment to monitor the test process. The engineer or technician is needed to restart the test after an error. If someone was not available on site to fix the error and restart the test, the test was paused indefinitely until an engineer or technician became available. Thus, testing of newly installed equipment can take longer than necessary due to an unavailability of personnel to fix and restart tests. Additionally, if personnel were available, an engineer or technician would be required for each site at which new equipment has been installed and is being tested.

Thus, it would be advantageous to have an improved method and apparatus for testing equipment installed in a communications system.

SUMMARY OF THE INVENTION

The present invention provides a method and apparatus for testing network elements within a communications system. A test is initiated at a data processing system located at a first site by the selection of one or more network elements for testing. In initiating the test, a communications link is established between the data processing system located at the first site and a network element located at a second site. The network element is monitored during testing of the network element using the communications link. The information is displayed on the data processing system in the form of a web page. Monitoring of the network element is paused from the data processing system in response to detecting an error originating from the network element. Monitoring of the network element is restarted from the data processing system in response to a correction of the error. These steps of monitoring, pausing, and restarting are repeated until a selected amount of time has passed without an occurrence of an error originating from the second network element.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 6A–6I are diagrams of an interface displayed within a data processing system in accordance with a preferred embodiment of the present invention;

FIG. 10 is a block diagram of work requests in a dispatch table in accordance with a preferred embodiment of the present invention;

DETAILED DESCRIPTION

Figure 1:
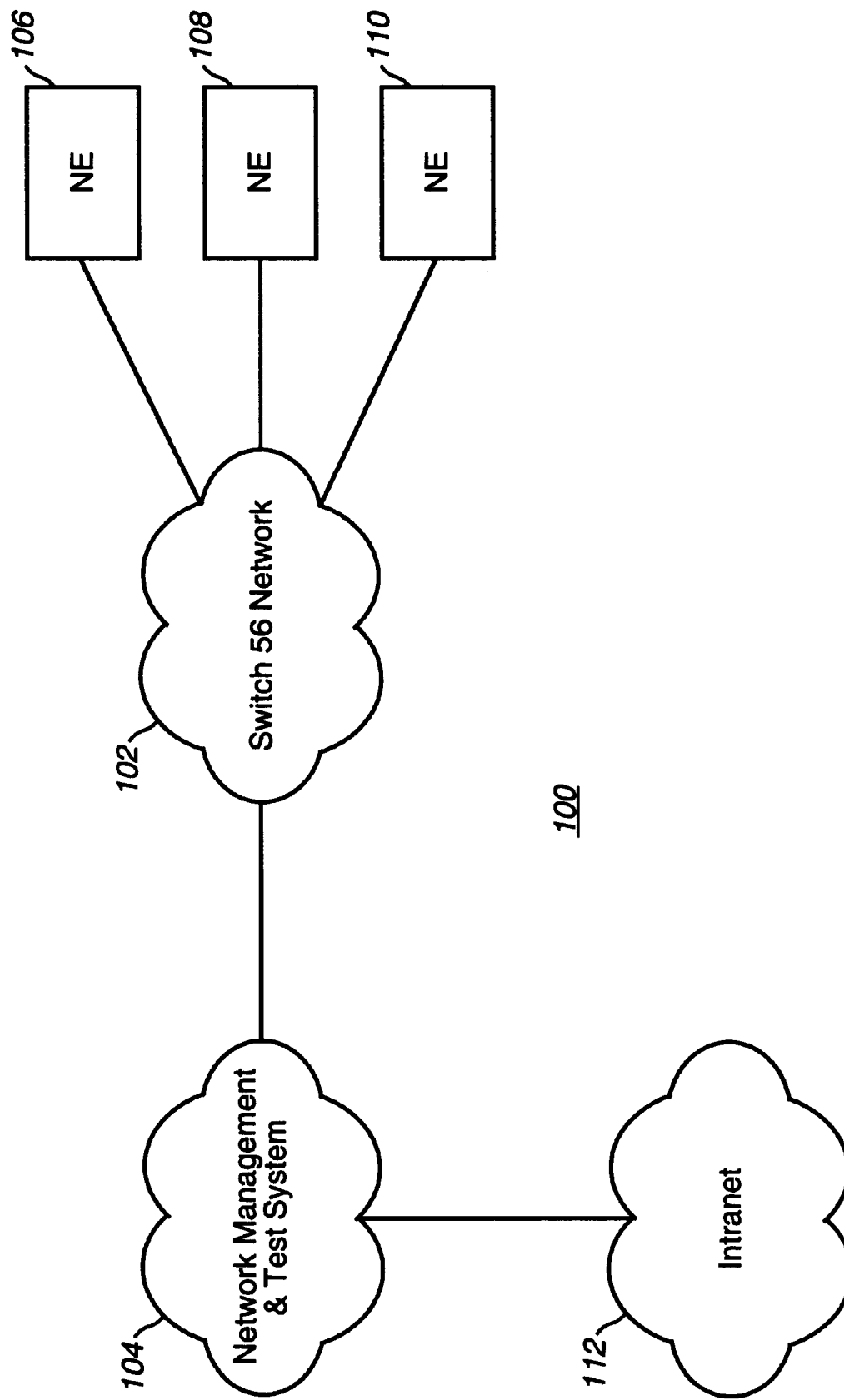
FIG. 1 is an illustration of a communications system in which the present invention may be implemented in accordance with a preferred embodiment of the present invention.

With reference now to the figures, and in particular with reference to FIG. 1, an illustration of a communications system in which the present invention may be implemented is depicted in accordance with a preferred embodiment of the present invention. Communications system 100 includes a communications network, such as switch 56 network 102, which provides communications between network management and test system 104 and network elements, such as network elements 106, 108, and 110. Network management and test system 104 also has a communications link to intranet 112. Switch 56 network 102 is a controlled 56 kbit/s routing network and is a private network in the depicted example. Of course, other types of communications network may be used in place of switch 56 network 102. The present invention provides processes, systems, and computer readable media that may be implemented within communications system 100. In particular, the present invention may be implemented within network management and test system 104. In the depicted example, these processes may be controlled through users located on intranet 112.

Figure 2:
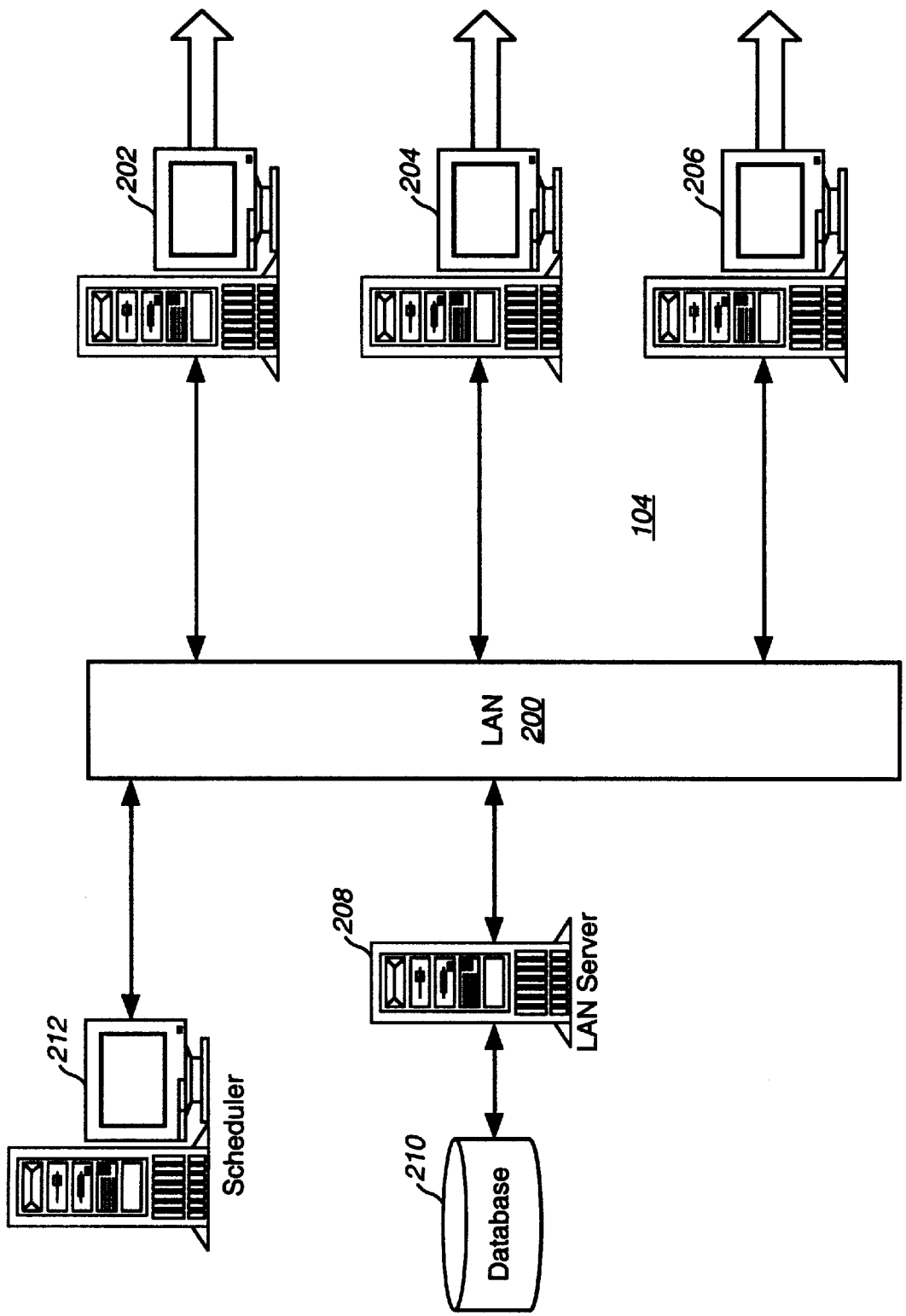
FIG. 2 is a block diagram of a network management and test system in accordance with a preferred embodiment of the present invention.

Turning next to FIG. 2, a block diagram of a network management and test system from FIG. 1 is depicted in accordance with a preferred embodiment of the present invention. Network management and test system 104 includes a local area network (LAN) 200, which provides communications between various components within network management and test system 104. Collectors 202, 204, and 206 are connected to local area network 200 and are able to establish communications links with switch 56 network 102 in FIG. 1. These collectors are employed to collect performance and other test data from network elements through switch 56 network 102. A collector establishes a communications link with a network element by dialing a number associated with the desired network elements that is directly connected to switch 56 network 102. In the depicted example, each collector includes eight ports providing connections to switch 56 network 102. The controllers can make simultaneous calls to various network elements located within the communications system.

LAN server 208 also is connected to local area network 200 and provides data retrieval from database 210. Also located within network management and test system 104 is a scheduler 212, which coordinates requests for information from network elements. In particular, scheduler 212 coordinates requests for information through collectors 202, 204, and 206. Local area network 200 also provides a connection to intranet 112 in FIG. 1, which is described in more detail below in FIG. 3.

Figure 3:
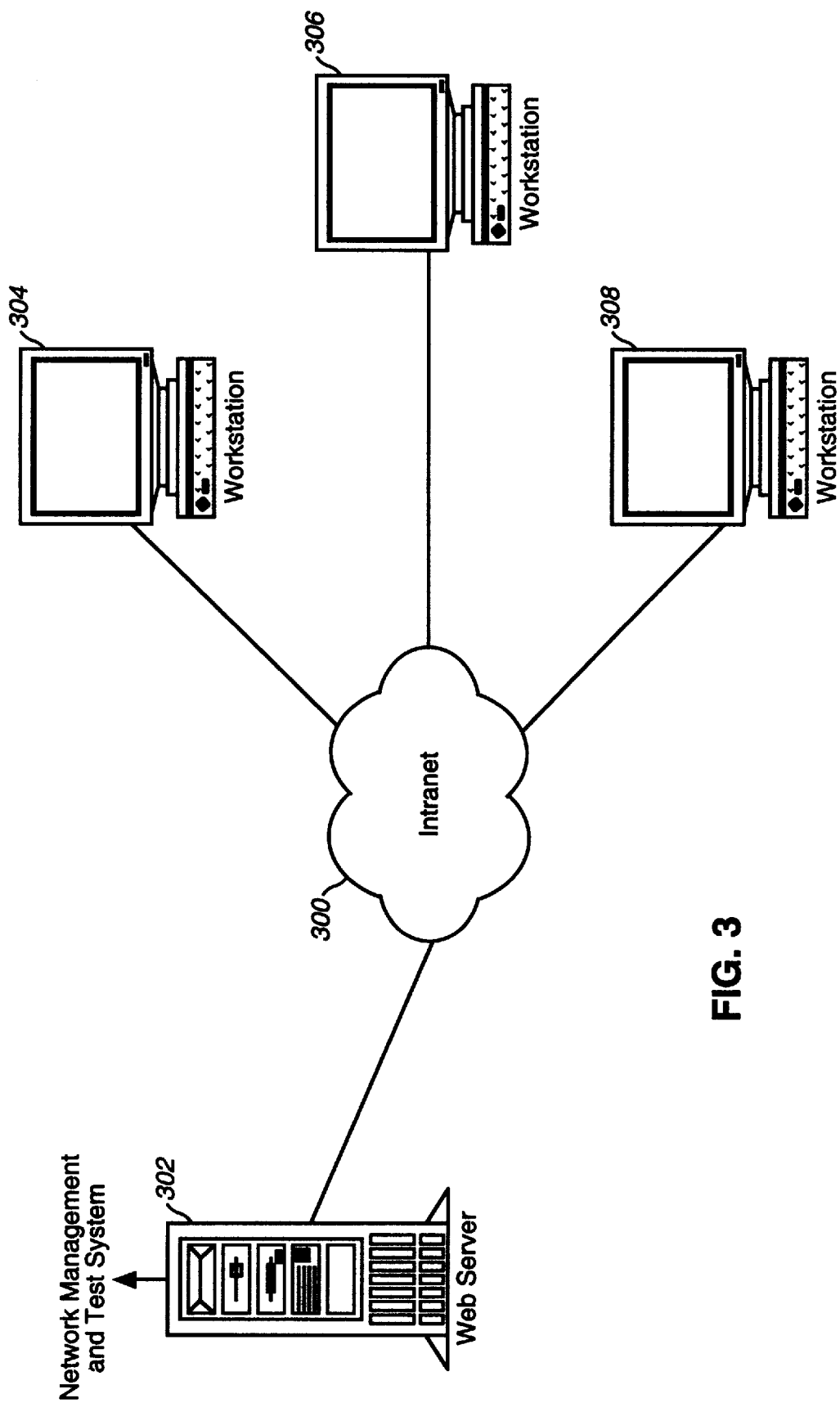
FIG. 3 is a block diagram of an intranet in accordance with a preferred embodiment of the present invention.

Turning now to FIG. 3, a block diagram of an intranet is depicted in accordance with a preferred embodiment of the present invention. Intranet 300 includes a web server 302, which has a communications link to local area network 200 in FIG. 2. This intranet is used to test network elements. Additionally, web server 302 provides information on web pages to workstations 304, 306, and 308 through intranet 300. In this manner, information from tests, such as reporting status of network elements being tested, may be provided to various users connected to intranet 300 through workstations, such as workstations 304, 306, and 308. These workstations may be located across large geographical regions, allowing users to monitor testing of network elements from various locations. Workstations 304, 306, and 308 may be implemented using various data processing platforms running web browsers, such as Netscape's Navigator or Microsoft's Internet Explorer. In this manner, multiple users located at different geographical locations may test network elements located at different geographical locations from those of the users. In particular, users may use workstations to remotely test network elements.

Figure 4:
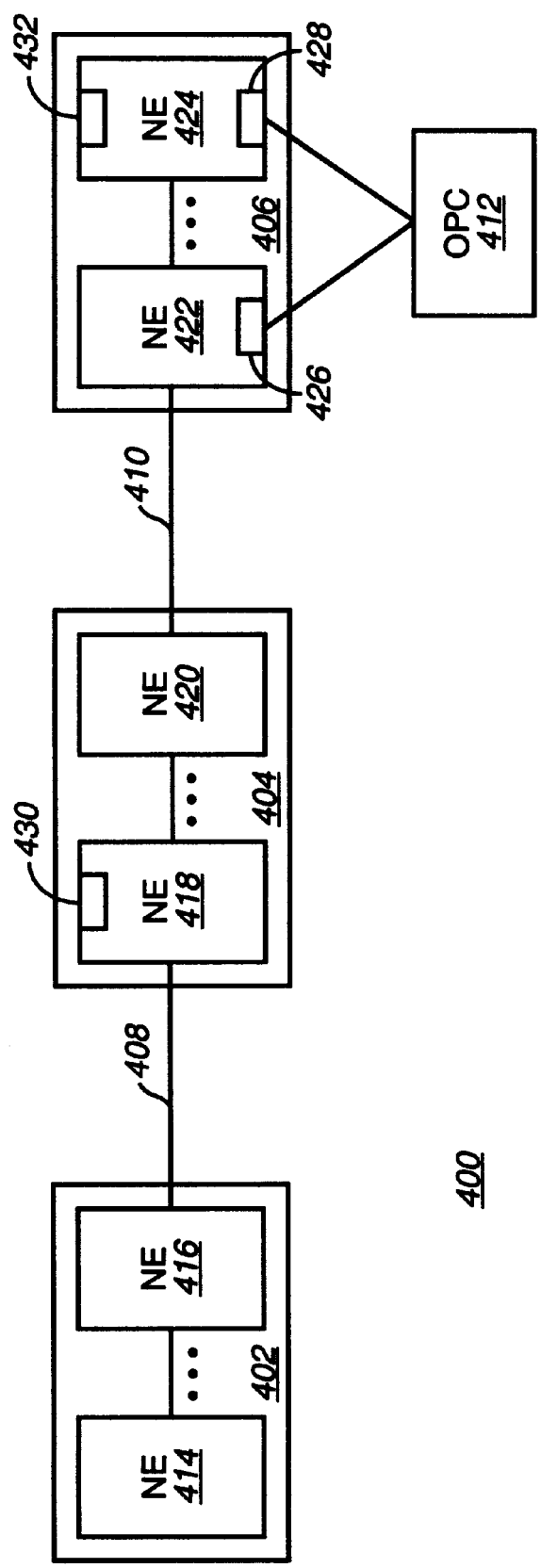
FIG. 4 is a block diagram of network elements in accordance with a preferred embodiment of the present invention.

Turning next to FIG. 4, a block diagram of network elements is depicted in accordance with a preferred embodiment of the present invention. The network elements in the depicted example are grouped into operations controller (OPC) groups, which are then grouped into data communications channel (DCC) groups. For example, DCC 400 contains OPC groups 402, 404, and 406, which are interconnected to each other by communications links 408 and 410. Communications links 408 and 410 are established via SONET DCC overhead bytes in the depicted example. OPC groups 402, 404, and 406 are associated with a single OPC group 412. Each of the OPC groups includes a number of network elements. In particular, OPC group 402 includes network elements 414 and 416; OPC group 404 contains network elements 418 and 420; and OPC group 406 contains network elements 422 and 424. Each of the network elements within an OPC group is connected to another network element and hence a communication path exists to any network element in the DCC span. OPC group 412 interfaces with network elements 422 and 424 within OPC group 406 through control network connections (CNet) 426 and 428. These CNet ports allow OPC group 412 to retrieve information from each of the network elements within OPC group 406. Additionally, configuration changes can be made to the network elements through these communications ports.

Information also may be retrieved from network elements through network ports 430 and 432. These network ports provide communications link to network management test system 104 through switch 56 network 102. In particular, network ports 430 and 432 are connected to switch 56 network 102, which in turn has connections to various collectors within network management and test system 104. These ports allow network management and test system 104 to interrogate and retrieve information from network elements located within DCC group 400 even though a direct connection is not provided to each network element within DCC group 400. In particular, a controller may access a network element, such as network element 424, through network port 432. From network element 424, the controller can log in and access network element 424 through its connection to network element 422. In this manner, a single controller can access all of the network elements within a DCC group through the connections between the various network elements.

These communications ports, network ports 430 and 432, include craft interfaces which allow retrieval of diverse types of information from the network elements, such as, for example, predefined alarm and performance data, card level inventory data (e.g. configuration, parameter, serial numbers and software versions), tributary layout information and laser bias information may be retrieved. Effectively, all information stored or collected by a network element computer or processor is retrievable through these network ports.

Figure 5:
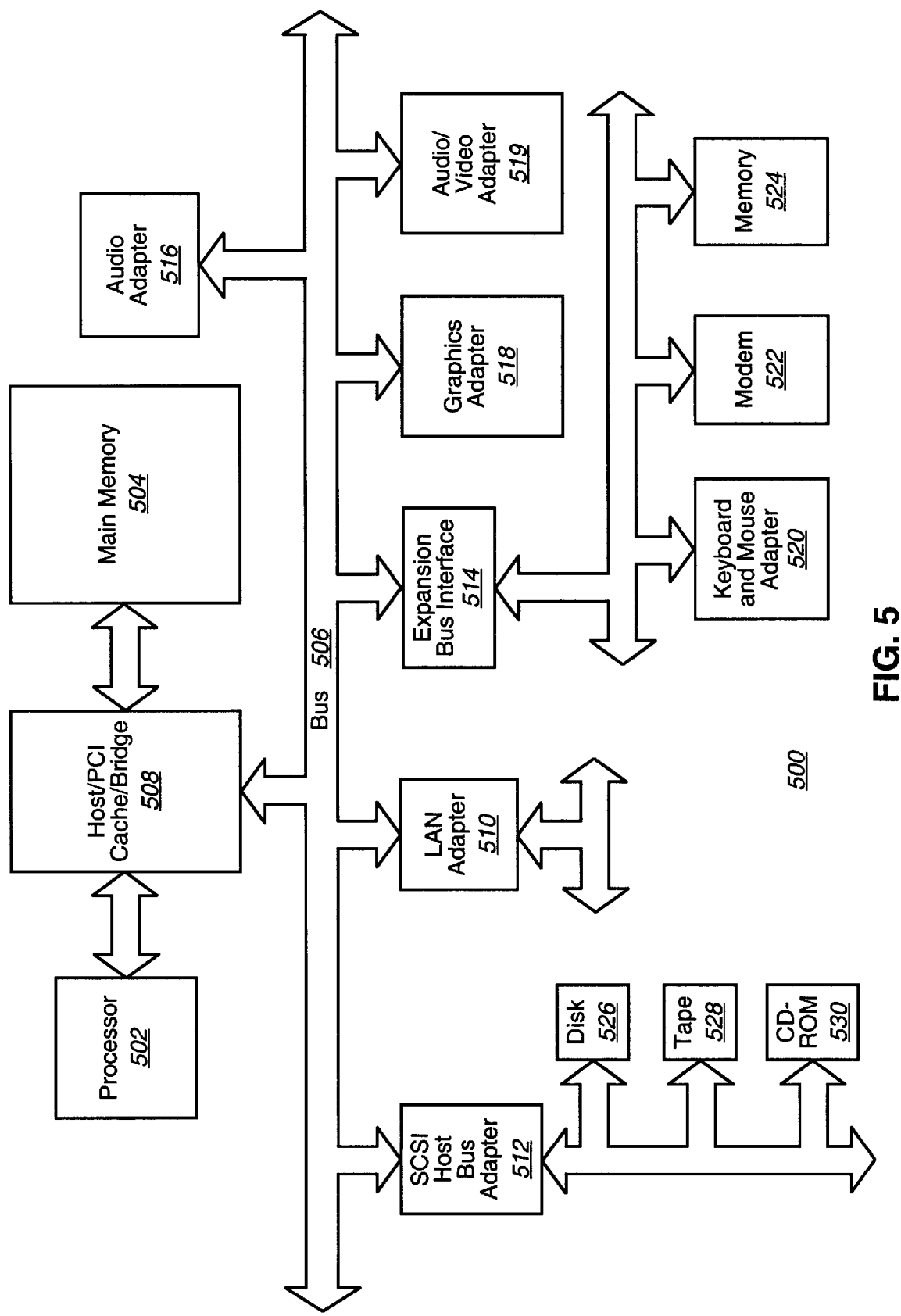
FIG. 5 is a block diagram of a data processing system in which the present invention may be implemented.

With reference now to FIG. 5, a block diagram of a data processing system 500 in which the present invention may be implemented is illustrated. Data processing system 500 may be used to implement various components within communications system 100. For example, computer systems, such as, a scheduler, a LAN server, a collector, a web server and a workstation may be implemented using data processing system 500.

Data processing system 500 employs a peripheral component interconnect (PCI) local bus architecture. Although the depicted example employs a PCI bus, other bus architectures such as Micro Channel and ISA may be used. Processor 502 and main memory 504 are connected to PCI local bus 506 through PCI bridge 508. PCI bridge 508 also may include an integrated memory controller and cache memory for processor 502. Additional connections to PCI local bus 506 may be made through direct component interconnection or through add-in boards. In the depicted example, local area network (LAN) adapter 510, SCSI host bus adapter 512, and expansion bus interface 514 are connected to PCI local bus 506 by direct component connection. In contrast, audio adapter 516, graphics adapter 518, and audio/video adapter (A/V) 519 are connected to PCI local bus 506 by add-in boards inserted into expansion slots. Expansion bus interface 514 provides a connection for a keyboard and mouse adapter 520, modem 522, and additional memory 524. SCSI host bus adapter 512 provides a connection for hard disk drive 526, tape drive 528, and CD-ROM 530 in the depicted example. Typical PCI local bus implementations will support three or four PCI expansion slots or add-in connectors. The depicted example includes four loads on the motherboard and three expansion slots. Those of ordinary skill in the art will appreciate that the hardware in FIG. 5 may vary. For example, other peripheral devices, such as optical disk drives and the like may be used in addition to or in place of the hardware depicted in FIG. 5. The depicted example is not meant to imply architectural limitations with respect to the present invention.

Turning now to FIGS. 6A–6I, diagrams of an interface displayed within a data processing system are illustrated in accordance with a preferred embodiment of the present invention. These diagrams are examples of a graphical user interface (GUI) in the form of web pages displayed using a browser program, such as Internet Explorer from Microsoft Corporation. A user is able initiate testing of one or more network elements using these interfaces in addition to monitoring test progress for one or more network elements from a data processing system, such as work station 304 attached to intranet 300 in FIG. 3. The GUI depicted in FIGS. 6A–6I are used to execute a live remote system test for a SONET network in the depicted example. In particular, the live remote test is for newly installed network elements. The new network elements are required to log a specific number of hours of error free performance to satisfy testing requirements. In the depicted example, these logged hours do not have to be consecutive. When an error occurs, however, the clock or counter is stopped, the error is fixed, and the test restarted with the counter also being restarted. All of these steps are performed remotely through a workstation, such as workstation 304 attached to intranet 300. This sequence is repeated until the required hours of error free performance are logged by the new network elements. The data processing system is employed to remotely control testing and monitoring the network elements through the network management and test system.

Figure 6A:
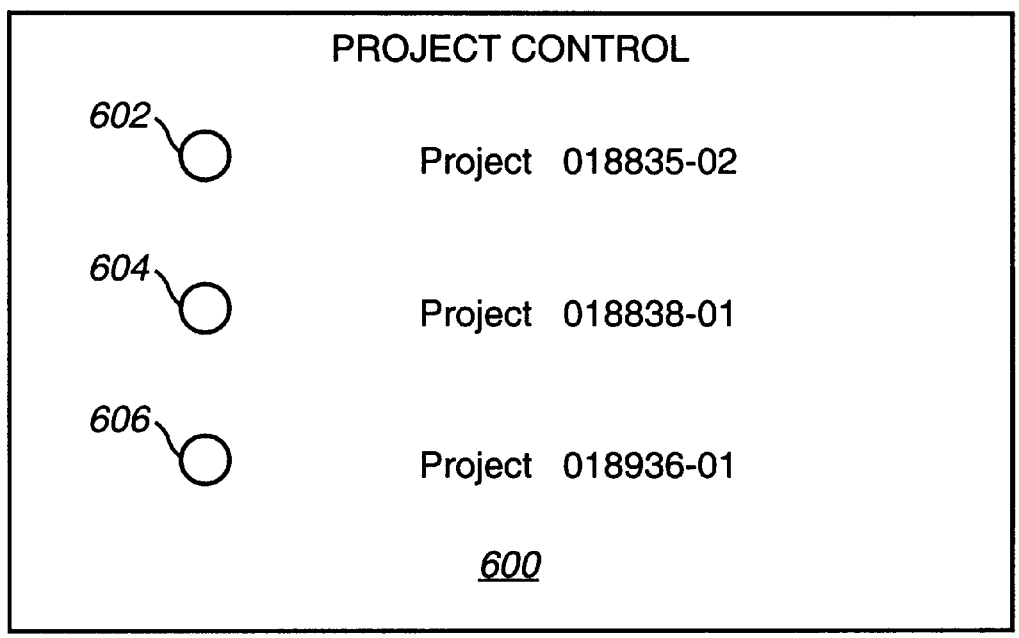
Figure 6C:
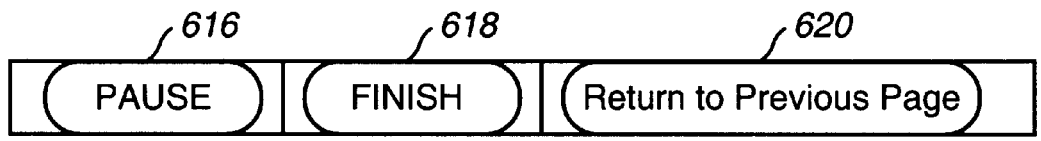
Figure 6D:

A project control page 600 is displayed in FIG. 6A. This project control page is a web page in the depicted example from which a user may select projects for testing using buttons 602, 604, and 606. Selection of button 602 results in starting a test for project 018835-02. Details of the test are illustrated in page 608 as illustrated in FIG. 6B. This screen provides details such as the type of the system, the status of the test, the date/time the test was started, the hours of testing, the progress, the estimated time and date of completion, restarts, supervisor information and a project description. Page 608 also includes a project control button 610, which allows a user to select another project. Additionally, page 608 includes a project log editor button 612. In FIG. 6C, page 614 is a button 618, which are used to pause testing or finish testing. Button 620 is used to return to a previously displayed page. Selecting pause button 616 results in page 622 in FIG. 6D being displayed on the data processing system. Field 624 of page 622 prompts a user to enter a reason for pausing the test in field 626, which will be stored in a log for the project. The test is paused when a user selects OK button 628. The pausing of the test may be cancelled by selecting cancel 630.

Figure 6E:
Figure 6F:

After pausing a test, page 632 in FIG. 6E is displayed within the data processing system. As can be seen, page 632 indicates that the test is paused in fields 634 and 636. The date/time that the test was paused is found in field 638. The reason for pausing the test is displayed in field 640. This reason was entered on page 622 in FIG. 6D. When the error has been corrected, the test may be restarted by selecting restart button 642. Button 644 allows a user to return to a previous page. In response to selecting restart button 642, page 646 is displayed within the data processing system. This page serves to confirm restarting of the test on the network element. In FIG. 6F, field 648 prompts the user to enter problems found and correct or other relevant information in field 650. By selecting OK button 652, the test then restarts. The restart may be cancelled by selecting cancel button 654.

A project log 656 is displayed in FIGS. 6G and 6H. Column 658 is a log time column, which displays the date and time of log entries. Column 660 indicates the type of event. Column 662 is a log entry column providing test information. Column 664 is an edit column providing buttons for log entries that may be edited by a user. For performance events, a log entry includes information about errors that have occurred. For example, in log entry 666 in E column 668 is an identification of the network elements, while level column 670 indicates the type of connection, such as, for example, OC48, OC12 or DS3. DIR column 672 indicates the direction of the error with a "T" indicating transmit and an "R" indicating receive. Span column 674 indicates the type of error with a line error being from the edge of the box of a network element, while a path error indicates an error along the path through the network element. CV column 676 indicates the type of code violation, which shows the sum of bit errors in the depicted example. ES column 678 shows the error seconds with SES column 680 illustrating the severe error seconds. UAS column 682 shows unavailable error seconds that have occurred. Project control button 681 is used to return the user to page 600 in FIG. 6A, while previous page button 683 returns the user to the previously displayed page.

Figure 6I:
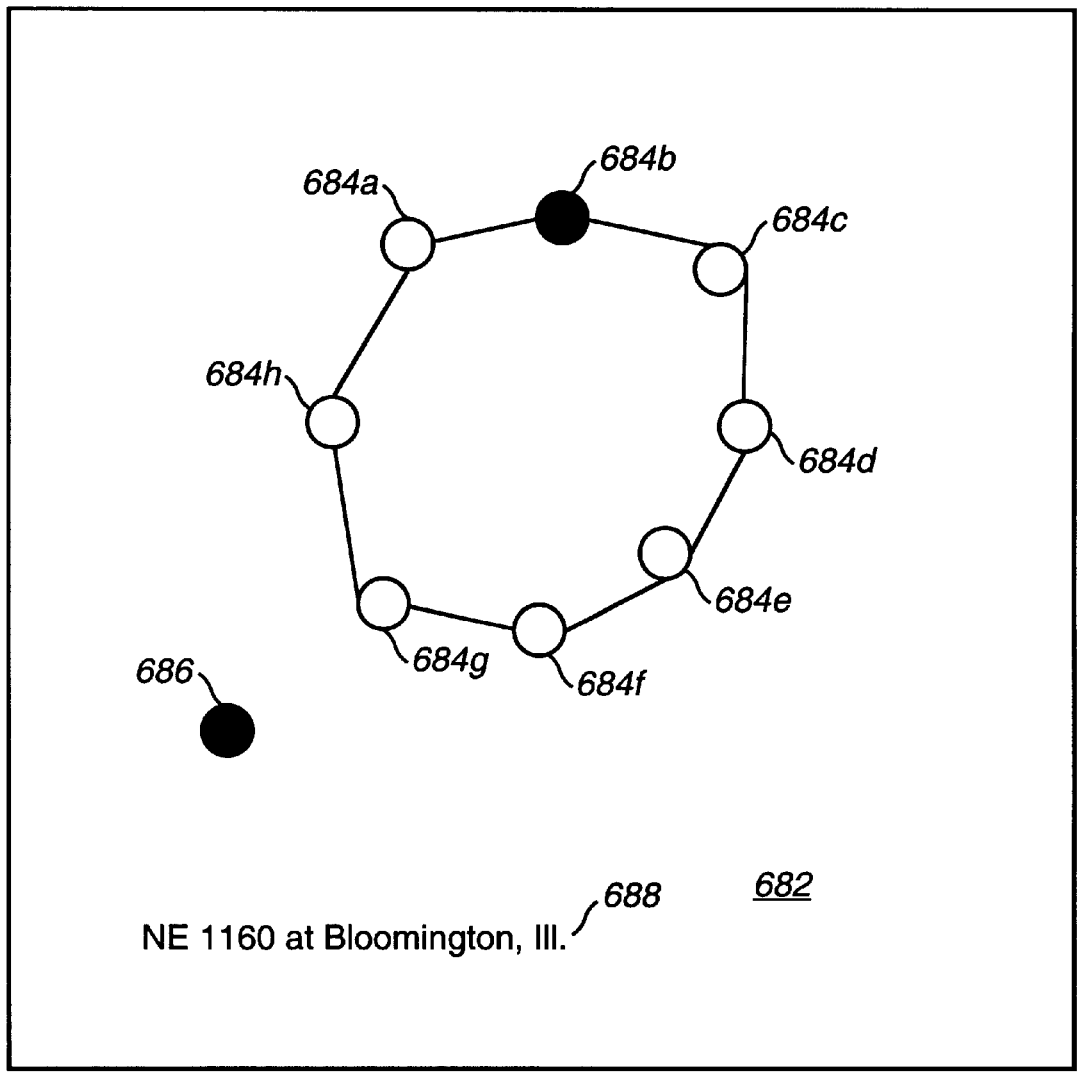

When an error occurs, a page containing a location map may be displayed on the data processing system. For example, page 682 in FIG. 6I shows a user and the location of network elements being tested along with the location of the network element receiving the error. Page 682 shows network elements 684*a*–684*h*, which are connected to each other in a ring fashion. On page 682, the user and the user's relative location to the network elements is illustrated by node 686. In the depicted example, network element 684*b* has received an error with this network element being shown in a different shade or color from the remaining network elements. Network element 684*b* receives an error that originates from somewhere along a transmission path from other network elements. Additionally, an indication of the network element number and location is displayed in field 688. Of course, additional information also may be displayed to the user, such as, the distance to the network element generating the error or the city in which the network element is located. Additionally, page 682 may reflect the section along which the error has occurred. A section is a measurable portion of the path between network elements.

Figure 7:
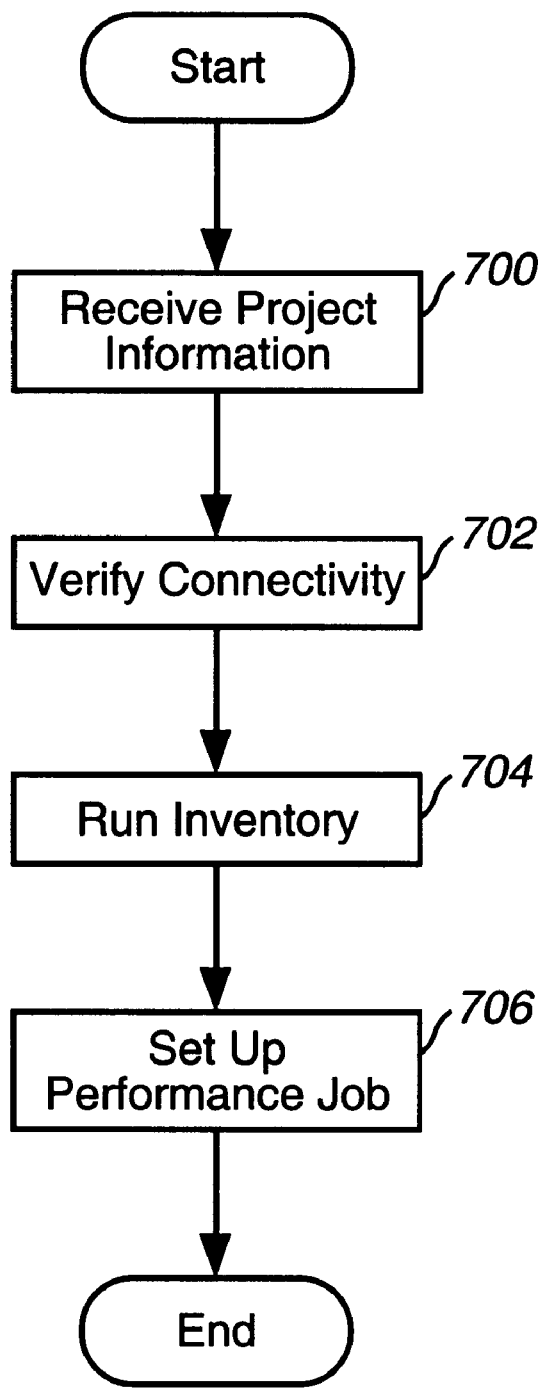
FIG. 7 is a flowchart of a process used by a scheduler for setting up a test in accordance with a preferred embodiment of the present invention.

With reference next to FIG. 7, a flowchart of a process used by a scheduler for setting up a test is depicted in accordance with a preferred embodiment of the present invention. The process begins by receiving project information (step 700). This project information includes information, such as, for example, identification of a system to be tested, including an identification of network elements to be tested in the system. Then, connectivity is verified (step 702). Verification of connectivity involves making sure that the network management and test system is able to communicate with the network elements to be tested. After verifying connectivity, an inventory is run (step 704). Running an inventory involves obtaining an internal card level inventory and configuration information on the network elements that have been identified for testing. The inventory information includes information, such as, how each network element is laid out, cards located within each network element, and various parameters set for each network element. The performance job is then set up (step 706). The set up includes placing all commands needed into a program or script to be executed when testing begins. These commands are those necessary to pull data from the network elements during the testing of these network elements.

Figure 8:
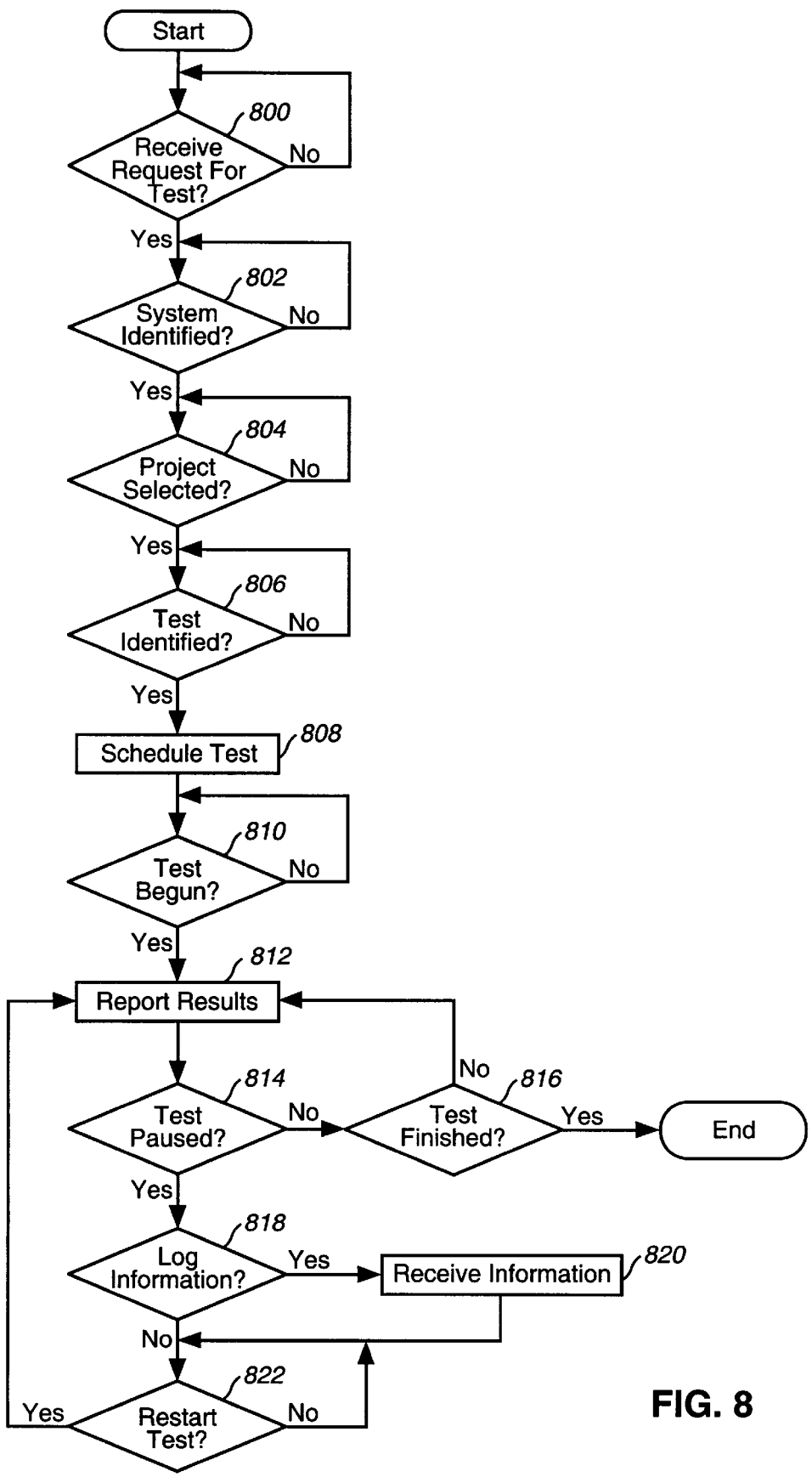
FIG. 8 is a flowchart of a process used by a scheduler for testing network elements in accordance with a preferred embodiment of the present invention.

Turning next to FIG. 8, a flowchart of a process used by a scheduler for testing network elements is depicted in accordance with a preferred embodiment of the present invention. The process begins by determining whether a request has been received for a test (step 800). The process remains in this block until a request is received. In response to receiving a request for a test, a determination is then made as to whether the system to be tested has been identified (step 802). A system in the depicted example is an interconnected communications network containing many network elements. When a system is identified, then the process determines whether a project has been selected (step 804). A project is a selected grouping of one or more new network elements added to that system. The process continues to return to step 804 until selection of a project has occurred. Upon selection of a project, a determination is then made as to whether a test has been identified (step 806). Identification of a test may identify a test for one or more network elements. The process returns to step 806 until identification of a test has occurred.

When a test is identified, the identified test is then scheduled (step 808). After scheduling of a test, a determination is made as to whether testing one or more network elements has begun (step 810). If the process has not detected the beginning of the test, the process will return to step 810. Otherwise, reporting of results occur (step 812). Results are reported by the network management and test system to a user located at a workstation connected to an intranet that is in communication with the network management and test system. A determination is then made as to whether the test has been paused (step 814). In the depicted example, the test is paused by the tester at the workstation in response to an occurrence of an error as indicated and the results reported to the user. If the test has not been paused, the process then determines if the test is finished (step 816). If the test is not finished, the process returns to step 812 to continue to report results. Otherwise, the process terminates.

Referring back to step 814, if the test has been paused, a determination is then made as to whether information is to be logged in response to the error (step 818). If information is to be logged, the process then receives the information for the log (step 820) and then determines whether to restart the test (step 822). The process also proceeds to step 822 directly from step 818 if information is not to be logged in response to the error. If the test is not restarted, the process remains in step 822. Upon determining that the test is to be retested, the process then returns to step 812 to report results.

Figure 9:
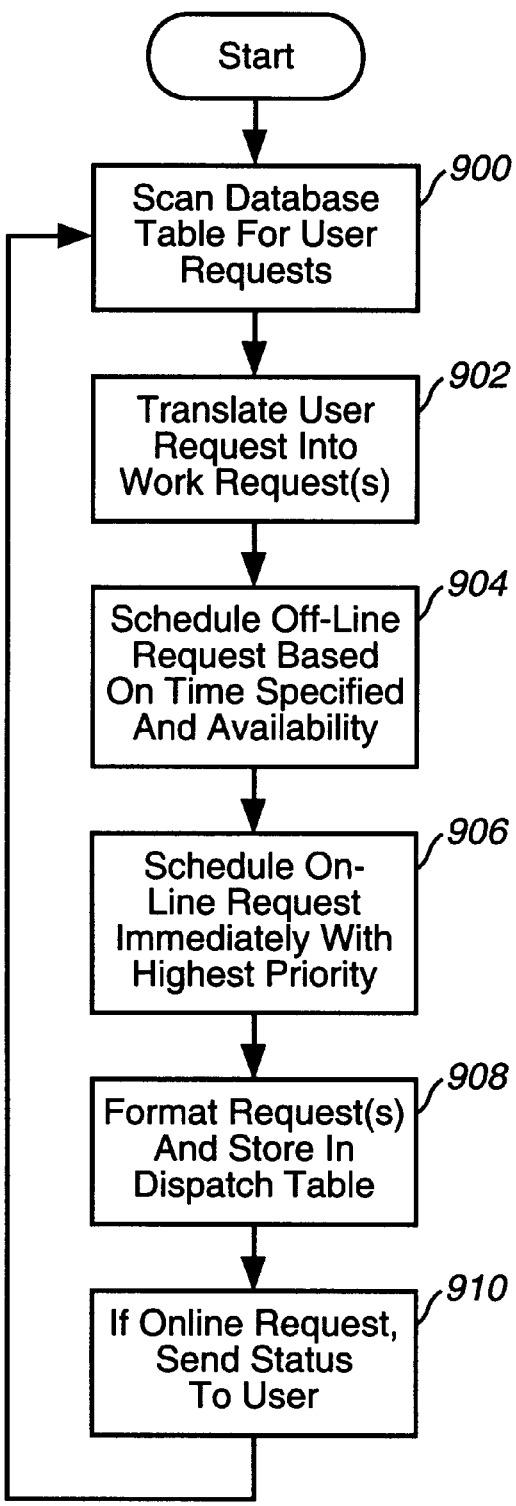
FIG. 9 is a flowchart of a process implemented within a scheduler for reading and processing requests in accordance with a preferred embodiment of the present invention.

Turning now to FIG. 9, a flowchart of a process implemented within a scheduler for reading and processing requests is depicted in accordance with a preferred embodiment of the present invention. The process begins by scanning a database table for user requests (step 900). Although these user requests are stored in a database table in the depicted example, requests may be stored using other mechanisms known to those of ordinary skill in the art. These requests include requests to test network elements in addition to requests for information from network elements already past the testing stage. A user request is translated into one or more work requests for one or more collectors (step 902). Translating a user request into a work request involves placing the network elements specified in the user request into groups coinciding with a DCC group. With the DCC group identified being converted into a single work request to be processed by a collector, such as, collector 202, 204, or 206 in FIG. 2. The telephone number of each directly connected network element, such as network element 404 in FIG. 4 is specified for each collector work request. A list of network elements in the operations to be performed thereon also is specified. A priority for each work request also is assigned. In the depicted example, on line requests are assigned the highest priority.

Next, off line requests are scheduled based on the time specified and availability (step 904). Scheduling a request results in a time and date window, beginning with a time and date and an ending time and date for the request, being assigned to the request. For off line requests, the time window assigned depends on currently scheduled work requests and the requested time specified, if any, in the user request. The process also schedules on line requests immediately, if possible with highest priority (step 906). These requests are then formatted in a form for storage in a dispatch table (step 908). This dispatch table is used to send the requests to the collectors. Then, a status is sent to users sending on line requests (step 910). The status information may be sent to a user in various forms, such as an e-mail message on a user web page, or a separate applet-launched user web page.

In FIG. 10, a block diagram of work requests in a dispatch table is depicted in accordance with a preferred embodiment of the present invention. Dispatch table 1000 in column 1002 lists the network elements and the operations to be performed thereon. The list of network elements includes a directly connected network element, one that includes a network port connected to column 1004 that shows a time/date window in which to process the request. Column 1006 in dispatch table 1000 illustrates the priority of the request while column 1008 is an optional field for identifying whether a specific collector is to process the request. This last field allows the use of dedicated collectors for processing requests. For example, it may be desirable to dedicate certain collectors for on line requests during day time hours and release those collectors at night.

Figure 11:
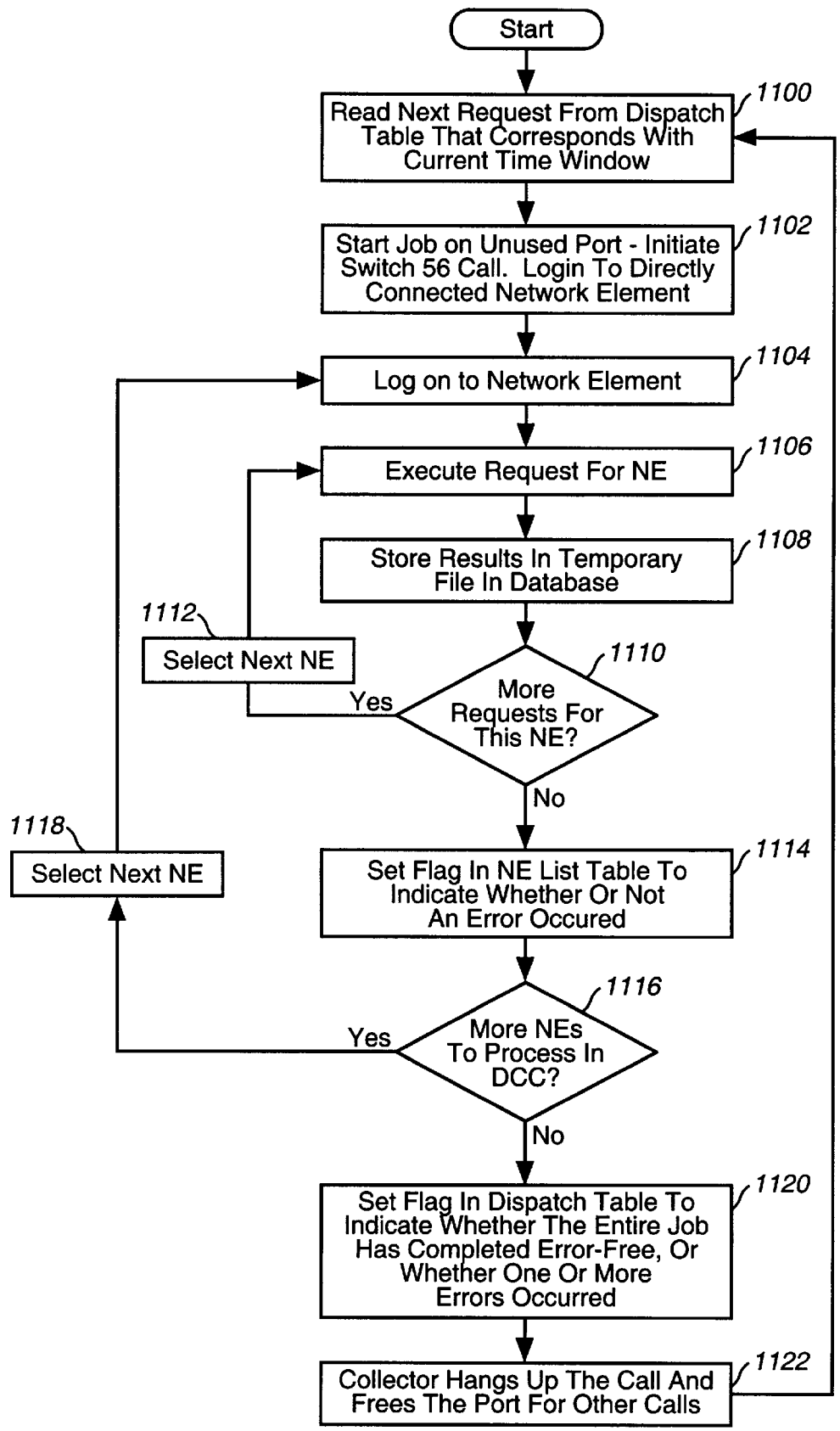
FIG. 11 is a flowchart of a process implemented by a collector for processing work requests in accordance with a preferred embodiment of the present invention.

Turning next to FIG. 11, a flowchart of a process implemented in a collector for processing work requests is depicted in accordance with a preferred embodiment of the present invention. The process begins by the collector reading the next request from the dispatch table that corresponds with the current time window (step 1100). In the depicted example, the request read from the dispatch table is one that falls into the current time/date window and having the highest priority. If a request having a high priority is not present, the dispatch table is searched for a request with a next highest priority. In this manner, work requests having higher priorities are processed before work requests having lower priorities. Next, the collector starts a job through an unused port by initiating a call through the switch 56 network to log in to the directly connected network element (step 1102). The collector calls the telephone number associated with a directly connected network element, such as network element 404 in FIG. 4.

Then, the collector logs onto the computer or microprocessor residing within the network element (step 1104). Next, any requests are executed for the network element (step 1106). For example, for a monitor request, performance data may be retrieved from the network elements. In the case of a configuration request, the current network element is configured. The results are stored in a temporary file within the database, such as database 210 in FIG. 2 (step 1108). In determination is made as to whether any more requests are present for the network element (step 1110). If additional requests are present for processing, the next request is selected (step 1112) with the process then returning to step 1106 to execute the new request. If additional requests are not present for the network element, the process then proceeds to set a flag in a list to indicate whether any errors have occurred during the processing of requests for the network element (step 1114).

Next, a determination is made as to whether additional network elements are present in the DCC for processing (step 1116). If additional network elements are present, the next network element is then selected (step 1118) with the process then proceeding back to step 1104 to log onto the new network elements. If no additional network elements are present, a process then sent a flag in the dispatch table to indicate whether the entire job has completed error free or whether the job has completed with errors (step 1120). Then, the collector hangs up or terminates the call, freeing up the port for other calls (step 1122) with the process than returning to step 1100 as described above.

Figure 12:
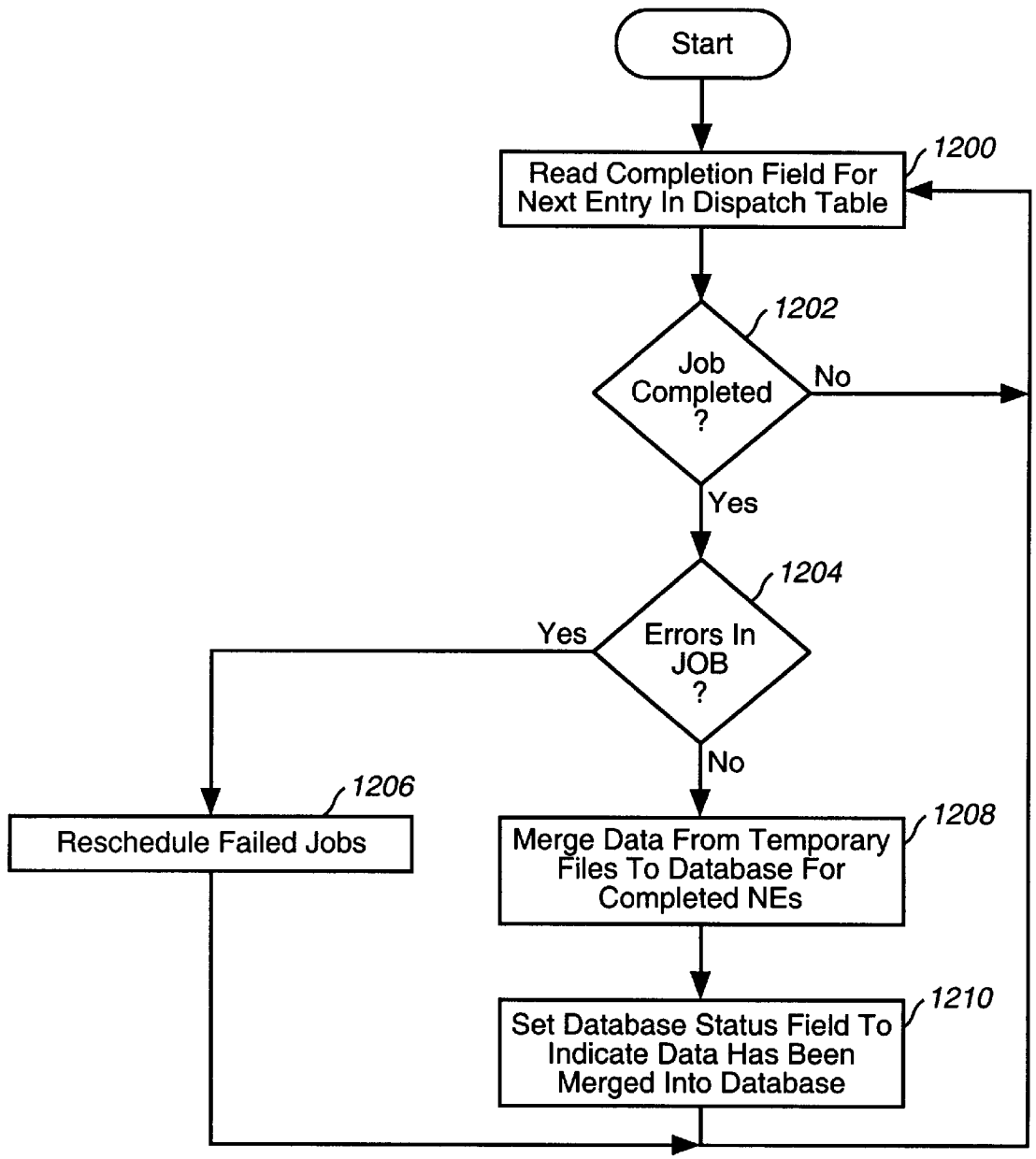
FIG. 12 is a flowchart of a process implemented by a scheduler to report data to a web server in accordance with a preferred embodiment of the present invention.

With reference now to FIG. 12, a flowchart of a process implemented a scheduler to report data to a web server in accordance with a preferred embodiment of the present invention. The process begins by the completion field for the next entry in the dispatch table (step 1200). A determination is made as to whether the job for the request has been completed (step 1202). If the job has not been completed for this entry, the process returns to step 1200. Otherwise, a determination is made as to whether an error has occurred in the job (step 1204). If an error has occurred, the failed job is rescheduled by the scheduler (step 1206) with the process then returning to step 1200 to read a completion field for the next entry. With reference again to step 1204, if no errors have occurred in the job, a process then merges data from the temporary files to a database for completed network elements (step 1208). The database field is the set to indicate that data has been merged into the database (step 1210) with the process then returning to step 1200.

Figure 13:
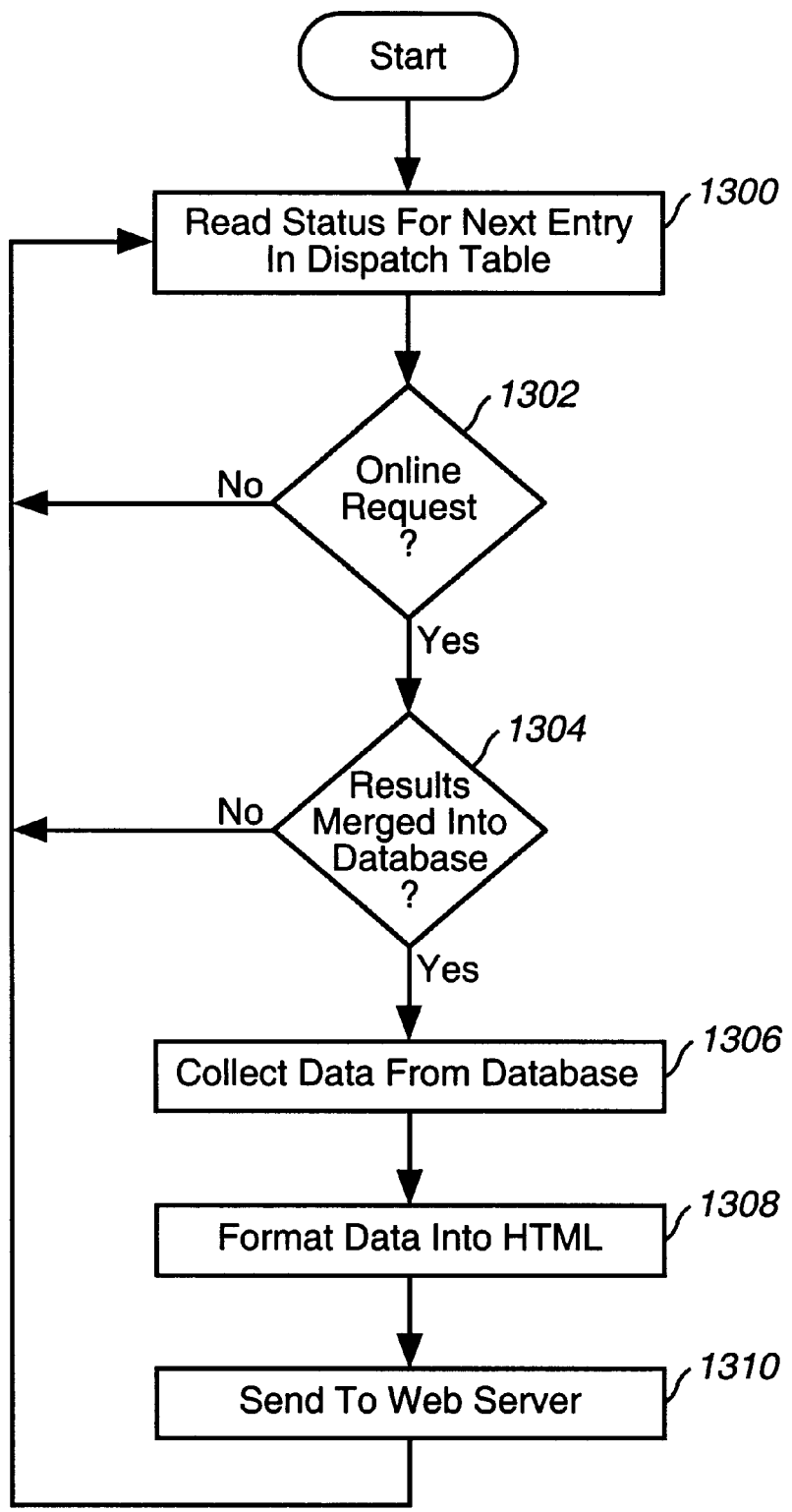
FIG. 13 is a flowchart of a process implemented by a scheduler to report data to a web server, such as a web server in FIG. 3.

With reference now to FIG. 13, a flowchart of a process implemented by a scheduler to report data to a web server, such as web server 302 in FIG. 3. The process begins by the scheduler reading the next entry in the dispatch table (step 1300). After reading the next entry in the dispatch table, a determination is made as to whether this entry is for an online work request (step 1302). If the request is not for an online work request, the process then returns to step 1300. Priority is provided for online work requests. When an online request is encountered, a determination is then made as to whether the results have been merged into database 210. If the data has not been merged, process returns to step 1300. Otherwise, the data is collected from the database (step 1306). The data is then formatted into a hypertext markup language (HTML) format used for documents on the World Wide Web (step 1308). The formatted HTML document is then sent to the web server (step 1310) with the process then returning to step 1300.

Figure 14:
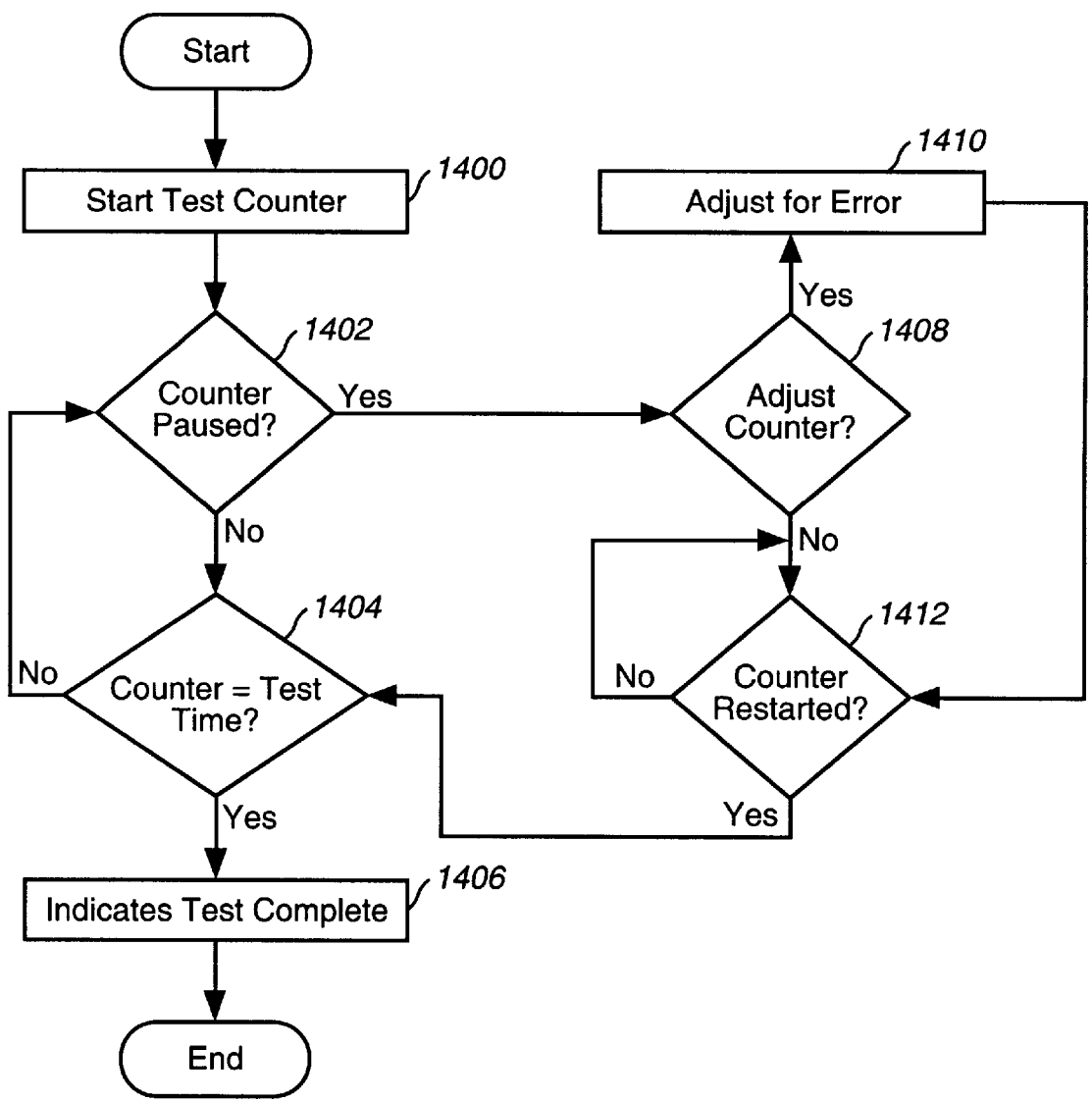
FIG. 14 is a flowchart of a process used by a scheduler for determining whether a test has been finished in accordance with a preferred embodiment of the present invention.

Turning next FIG. 14, a flowchart of a process used by a scheduler for determining whether a test has been finished is depicted in accordance with a preferred embodiment of the present invention. Process begins by starting the test counter (step 1400). The counter tracks the time elapsed during testing of network elements in a project selected for testing. The counter is employed to track cumulative time during which all of the network elements operate error free. A determination is then made as to whether the counter has paused (step 1402). The counter is paused when a user at a workstation pauses testing of the network elements. If the counter has not paused, a determination is made as to whether the test counter is equal to the test time (step 1404). If the test counter is not equal to the test time, the process returns to step 1402. The test time is the amount of time selected as being required for error free operation on the network elements. Otherwise, an indication is made that the test has been completed (step 1406).

Reference again to step 1402, if the counter has not been paused, a determination is made as to whether the counter is to be adjusted (step 1408). The counter may be adjusted to take into account a condition in which the error has occurred prior to the test being paused. When the counter is paused, it may have been paused sometime after the first error has occurred. The adjustment to the counter is made so that the counter reflects an error free period that is accumulated as part of the error free test time that is required for the project. If the counter is to be adjusted, the process then adjusts the counter to take into account the amount of time between the occurrence of the error at one or more network elements and the pausing of the counter (step 1410). After adjusting the counter for pauses, a determination is made as to whether the counter has been restarted (step 1412). The counter is restarted when the test is restarted. If the counter has not been restarted, the process returns to step 1410. When the counter is restarted, process then proceeds to step 1404 as previously described.

Figure 15:
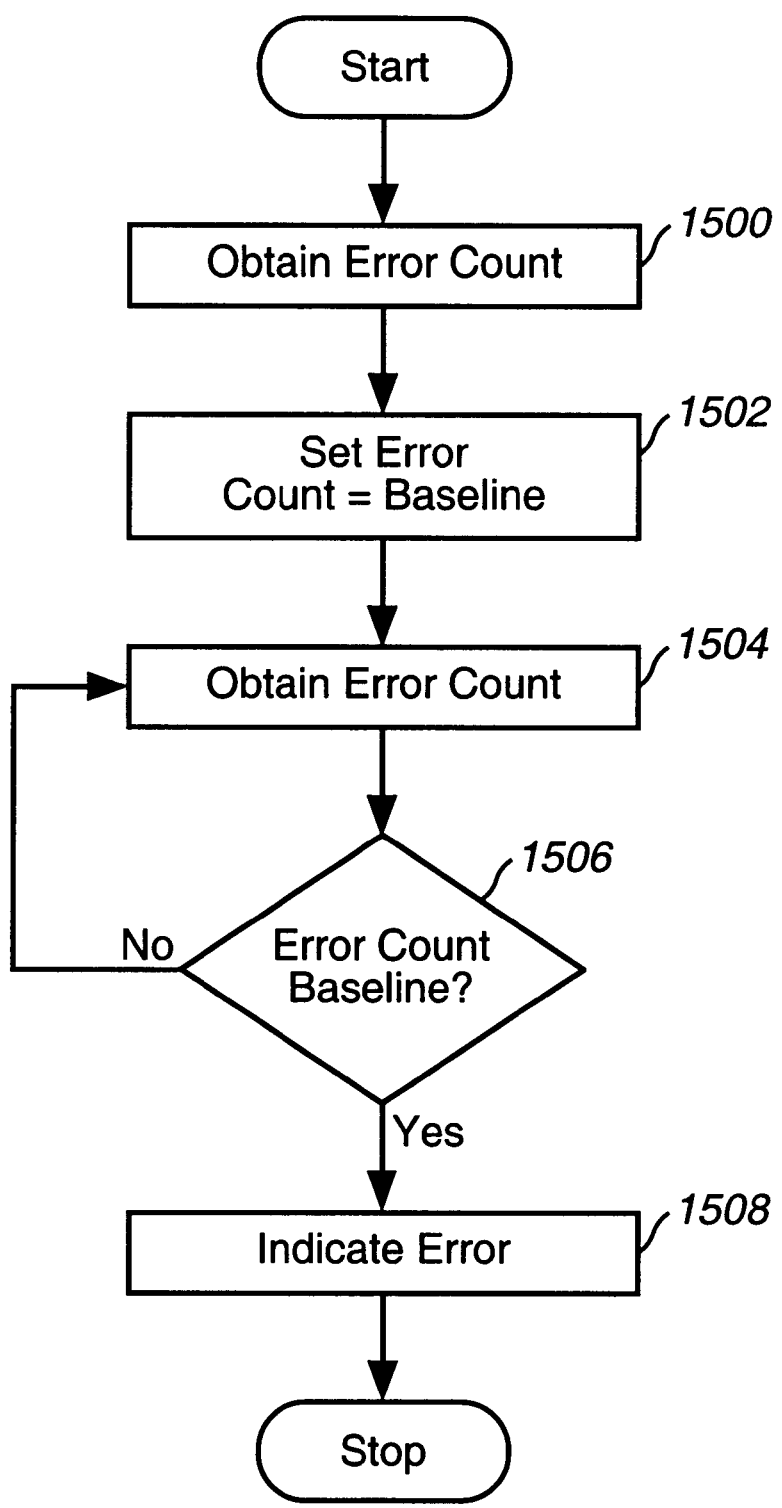
FIG. 15 is a flowchart of a process used by a scheduler for setting a baseline for detecting errors in accordance with a preferred embodiment of the present invention.

Turning to FIG. 15, a flowchart of a process used by a scheduler for setting a baseline for detecting errors is depicted in accordance with a preferred embodiment of the present invention. This process is initiated by a scheduler when testing of a network element is initiated. The process begins by obtaining an error count by the network element (step 1500). An error count is obtained because the network elements in the depicted example maintain a cumulative count of errors. The error count is set equal to the baseline (step 1502). The error count is then retrieved from the network element (step 1504). A determination is then made as to whether the error count is greater than the baseline (step 1506). If the error count is not greater than the baseline, the process then returns to step 1504 to retrieve the error count from the network element. This loop results in the error count being retrieved from the network element on a periodic basis. When the error count is greater than the baseline, an indication of an error is made (step 1508). This indication is displayed along with other information on a web page to a user, which allows the user to pause the test and correct the error. When a test is restarted, the process in FIG. 15 is used to set the new baseline and detect whether new errors have occurred.

Figure 16:
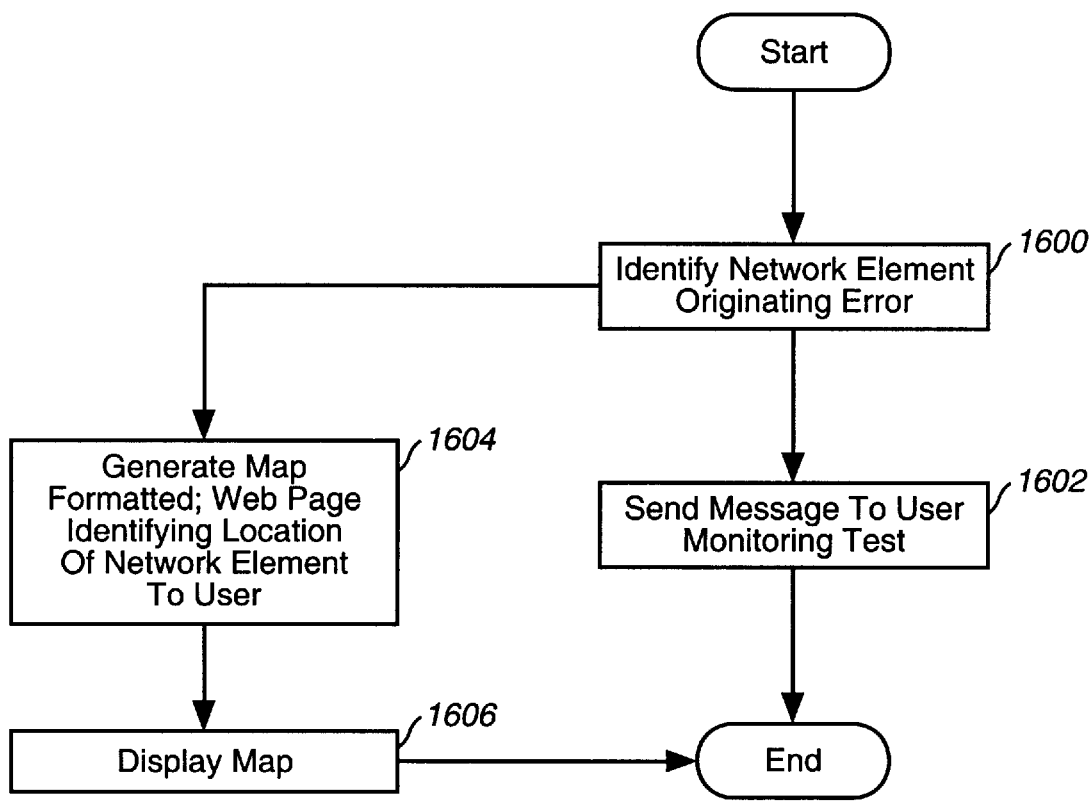
FIG. 16 is a flowchart of a process implemented in a scheduler to indicate errors to a user in accordance with a preferred embodiment of the present invention.

Turning now to FIG. 16, a flowchart of a process used by a scheduler indicating errors to a user is depicted in accordance with a preferred embodiment of the present invention. The process begins by identifying a network element originating the error (step 1600). Then, a message is sent to the tester monitoring the test of the identified network element (step 1602). Typically, this message is displayed along with other information on a web page to the user monitoring of the network element. For example, such information can be displayed on a page, such as page 614 in FIG. 6C. This message also may be in the form of an electronic message, such as, for example, e-mail message indicating that an error has occurred for a particular network element. Alternatively, the message may be sent in the form of a text message to a portable communications device, such as, for example, a pager carried by the user monitoring the testing of the network element. Some or all of these messages may be generated in step 1602.

At the same time the message is sent, the process also generates a map formatted for a web page, which identifies the location of the network element to the user monitoring the testing of the network elements. Such a page may be, for example, page 682 in FIG. 6I. With this map, a user testing a number of network elements may identify which network element has received an error and where that network element is located to facilitate correction of the error.

Thus, the present invention provides an improved method and apparatus for supporting live performance testing of newly installed network equipment. The present invention avoids the need for an engineer or technician to be on site to monitor the testing of each network element. The present invention provides this advantage through allowing the web to be part of a piece of test equipment. The present invention provides a structured remote web based method and system for monitoring and controlling the insulation/performance testing of each new and/or elements. Through the present invention, flexibility in which either on site or remote access control is provided. Additionally, a single technician or engineer may administer multiple tests from a single site. Furthermore, a single engineer or technician may monitor testing of many network elements located over large geographical regions.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disk, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. For example, although the depicted example employed a SONET system, the remote testing and monitoring provided may be applied to other types of communications systems. Additionally, the depicted example employed an intranet to connect the user to the network management and test system. Other types of networks may be used to connect the user, such as, for example, the Internet. The embodiment was chosen and described in order to best explain the principles of the invention the practical application to enable others of ordinary skill in the art to understand the invention for various embodiments with various modifications as are suited to the particular use contemplated.

What is claimed is:

1. A method for testing network elements within a communications network, the method comprising:

establishing a communications link between a data processing system located at a first site and one or more network elements located at one or more different sites;

monitoring the network elements during testing of the network elements using the, communications link;

identifying a network element originating an error during testing;

sending a message to the data processing system that an error has occurred;

pausing testing of the network element in response to an occurrence of the error at the network element;

restarting monitoring of the network element in response to a correction of the error; and repeating the steps of monitoring, pausing, and restarting until a selected amount of time has passed without an occurrence of an error originating from the network element.

2. The method of claim 1, wherein the step of monitoring the network element using the communications link comprises:

obtaining data from the network element while the network element is being tested;

formatting the data into a format for display on a web browser to form formatted data; and displaying formatted data on a data processing system located at the first site.

3. The method of claim 2, wherein the formatted data is in a form of a web page for display on a graphical user interface in the data processing system.

4. The method of claim 3, wherein the graphical user interface is a web browser.

5. The method of claim 1 further comprising:

informing a user of the error in response to receiving the message at the data processing system that an error has occurred.

6. The method of claim 5, wherein the step of informing a user of the error comprises:

sending a message to a portable communications device.

7. The method of claim 5, wherein the step of informing a user of the error comprises:

sending an email message to the user, wherein the email message indicates that an error has occurred.

8. The method of claim 1 further comprising:

establishing a second communications link between a second network element located at a third site and the data processing system located at the first site, monitoring the second network element during testing of the second network element using the second communications link;

pausing monitoring of the second network element in response to detecting an error originating from the second network element;

restarting monitoring of the second network element in response to a correction of the error; and repeating the steps of monitoring, pausing, and restarting until a selected amount of time has passed without an occurrence of an error originating from the second network element.

9. The method of claim 8 further comprising:

detecting an error received at a network element being tested;

identifying a location of the network element receiving the error; and formatting the location of the network element receiving the error for display from the data processing system.

10. The method of claim 1 further comprising:

initiating testing of the network element from the data processing system.

11. The method of claim 1, wherein the step of initiating testing of the network element includes starting a timer located at the first site.

12. A communications system comprising:

a communications network;

a plurality of network elements connected to the communications network;

a network management system connected to the communications network at a separate location from one or more of the plurality of network elements; and a data processing system connected to the network management system, wherein the data processing system communicates, executes, and monitors a test of a network element, pauses the test in response to an occurrence of an error originating from the network element; informs a user of the occurrence of the error, wherein the user is in a second location from the network element and data processing system and restarts the test in response to a correction of the error.

13. The communications system of claim 12, wherein the network management system includes:

establishment means for establishing a communications link between a data processing system and the network element;

reception means for obtaining data from the network element;

data formatting means for formatting data from the network element during testing of the network element using the communications link to form formatted data; and transmission means for transmitting the formatted data to the data processing system.

14. The communications system of claim 12, wherein the network management system includes a plurality of data processing systems connected to the communications network and the plurality of data processing systems collect data from network elements during testing of network elements using the communications network.

15. The communications system of claim 12, wherein the data processing system is connected to the network management system through a network.

16. The communications system of claim 15, wherein the network is an intranet.

17. The communications system of claim 14, wherein the network management system includes a scheduling data processing system, wherein the scheduling data processing system schedules collection of data from network elements through the plurality of data processing systems.

18. The communications system of claim 12, wherein the data processing system tests the network element until a selected amount of time has passed without an occurrence of an error originating from the network element.

* * * * *